United States Patent
Lou

(10) Patent No.: US 10,240,682 B2
(45) Date of Patent: Mar. 26, 2019

(54) OVER-MOLDED SPLINES FOR ROTARY VALVES

(71) Applicant: SCHAEFFLER TECHNOLOGIES AG & CO. KG, Herzogenaurach (DE)

(72) Inventor: Zheng Lou, Plymouth, MI (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 15/657,282

(22) Filed: Jul. 24, 2017

(65) Prior Publication Data
US 2019/0024815 A1    Jan. 24, 2019

(51) Int. Cl.
*F16K 27/06* (2006.01)
*F01P 7/14* (2006.01)
*F16K 11/085* (2006.01)

(52) U.S. Cl.
CPC .............. *F16K 27/065* (2013.01); *F01P 7/14* (2013.01); *F16K 11/085* (2013.01); *F01P 2007/146* (2013.01)

(58) Field of Classification Search
CPC .......... F16K 27/065; F16K 11/085; F01P 7/14
USPC ............................ 137/614.11, 614.16–614.18
See application file for complete search history.

(56) References Cited

U.S. PATENT DOCUMENTS

| | | | | |
|---|---|---|---|---|
| 4,655,252 A | * | 4/1987 | Krumhansl | F16K 11/0853 137/269 |
| 4,774,977 A | * | 10/1988 | Cohen | F16K 11/0525 137/271 |
| 5,937,903 A | * | 8/1999 | Afshar et al. | F16K 11/0856 137/597 |
| 6,568,428 B2 | * | 5/2003 | Pecci et al. | F16K 27/003 137/595 |
| 7,717,678 B2 | | 5/2010 | Chen | |
| 2009/0114867 A1 | * | 5/2009 | Miller et al. | F16K 31/1655 251/292 |

* cited by examiner

*Primary Examiner* — Kevin Lee
(74) *Attorney, Agent, or Firm* — Matthew V. Evans

(57) ABSTRACT

Rotary valve assemblies are disclosed, for example, for use in a thermal management system. The assembly may include a first rotary valve including a primary shaft including a hollow portion defining a first inner cavity and a first spline piece disposed within the first inner cavity on one end and including a primary spline feature on an opposite end, the primary spline feature having one or more primary splines. A second rotary valve may include a secondary shaft including a hollow portion defining a second inner cavity and a second spline piece disposed within the second inner cavity and including a secondary spline feature having one or more secondary splines. One or both of the first spline piece and the second spline piece may be formed of metal. The primary splines and the secondary splines may be configured to mesh together to form a spline joint between the rotary valves.

19 Claims, 5 Drawing Sheets

OVER-MOLDED SPLINES FOR ROTARY VALVES

TECHNICAL FIELD

The present disclosure relates generally to over-molded splines for rotary valves, for example, rotary valves in a thermal management module.

BACKGROUND

Rotary valves may be used to regulate the flow of liquid or gas through a system. In one example, one or more rotary valves may be included in a thermal management module (TMM) to regulate coolant in a vehicle's power or drive train. For example, after the engine is started, the TMM may block off the cooling jacket so that the engine heats up faster. When the engine has reached its optimum operating temperature, the TMM may open a coolant circuit and use the available heat to regulate the temperature of the engine, transmission, heating system, and/or other system components. The rotary valve(s) in the TMM may control the flow of coolant to the various components in the system.

SUMMARY

In at least one embodiment, a rotary valve assembly is provided. The assembly may include a first rotary valve including a primary shaft including a first spline piece having a primary spline feature including one or more primary splines; a second rotary valve including a secondary shaft including a second spline piece having a secondary spline feature including one or more secondary splines; and the primary splines and the secondary splines configured to mesh together to form a spline joint between the first and second rotary valves. At least one of the primary and secondary shafts has a hollow portion defining an inner cavity, at least one of the first spline piece and the second spline piece are formed of metal, and a portion of the metal spline piece is disposed within the hollow portion.

In one embodiment, each of the primary and secondary shafts may include a hollow portion defining an inner cavity and each of the first spline piece and the second spline piece may be formed of metal and a have a portion disposed within the hollow portion of the primary or secondary shafts. The primary shaft may be over-molded onto the metal first spline piece and the secondary shaft may be over-molded onto the metal second spline piece. Outer surfaces of the metal first spline piece and the metal second spline piece may be textured. The primary spline feature may be a male spline feature and the secondary spline feature may be a female spline feature configured to receive the primary spline feature, or vice versa. In one embodiment, the primary spline feature and the secondary spline feature have a keyed configuration. The keyed configuration may be a single key configuration or a multiple key configuration. In one embodiment, the primary and secondary spline features have a pair of mating polygon axial cross-sections. An outer surface of the secondary spline feature may be hexagonal in axial cross-section.

In one embodiment, the first spline piece may be formed of metal, and may further include a middle section between the primary shaft and the primary spline feature. The middle section may be configured to be supported by a bearing. In another embodiment, the secondary shaft includes the hollow portion, the second spline piece is formed of metal, and the inner cavity of the secondary shaft extends from a first end of the secondary shaft to a second, opposite end of the secondary shaft. The secondary spline feature may be located at the first end of the secondary shaft and the second spline piece may extend from the first end of the secondary shaft to the second end and include a tertiary spline feature at the second end that is configured to receive a tertiary shaft. In one embodiment, the first spline piece and the second spline piece are each formed of a metal having a coefficient of thermal expansion of at least 20×10-6 m/(m° C.).

In at least one embodiment, a method is provided. The method may include over-molding a primary shaft of a first rotary valve onto a first end of a first metal spline piece, a second end of the first metal spline piece including a primary spline feature; over-molding a secondary shaft of a second rotary valve onto a second metal spline piece including a secondary spline feature; and coupling the primary and secondary spline features together to form a metal-on-metal spline joint between the first and second rotary valves.

The method may further include texturing an outer surface of the first end of the first metal spline piece and an outer surface of the second metal splice piece prior to the over-molding steps; over-molding the primary shaft of the first rotary valve onto the textured outer surface of the first end of the first metal spline piece; and over-molding the secondary shaft of the second rotary valve onto the textured outer surface of the second metal spline piece. In one embodiment, the first metal spline piece includes a middle section between the first end and the second end, and the method further includes supporting the middle section in a bearing. In another embodiment, over-molding the secondary shaft of the second rotary valve onto the second metal spline piece includes over-molding an entire length of the secondary shaft onto the second metal spline piece. The second metal spline piece may include a tertiary spline feature on an opposite side from the secondary spline feature, and the method may further include coupling the tertiary spline feature with a tertiary shaft. In another embodiment, the primary spline feature has a polygon shape in axial cross-section and the secondary spline feature includes a polygon cavity sized and configured to receive the primary spline feature.

DETAILED DESCRIPTION

At the outset, it should be appreciated that like drawing numbers appearing in different drawing views identify identical, or functionally similar, structural elements. Furthermore, it is understood that this disclosure is not limited only to the particular embodiments, methodology, materials and modifications described herein, and as such may, of course, vary. As those of ordinary skill in the art will understand, various features illustrated and described with reference to any one of the figures can be combined with features illustrated in one or more other figures to produce embodiments that are not explicitly illustrated or described.

The terminology used herein is for the purpose of describing particular aspects only, and is not intended to limit the scope of the present disclosure, which is limited only by the appended claims. It is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments.

Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
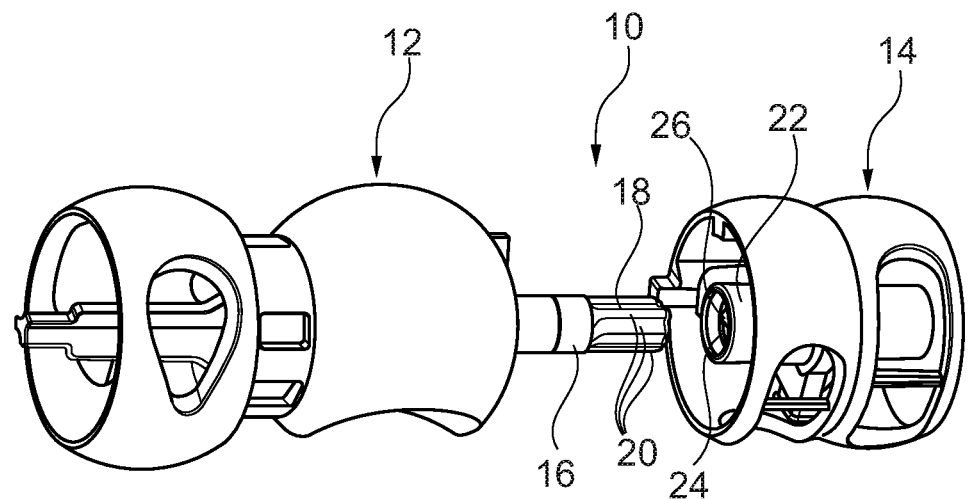
FIG. 1 is one perspective view of a rotary valve assembly, according to an embodiment.
Figure 2:
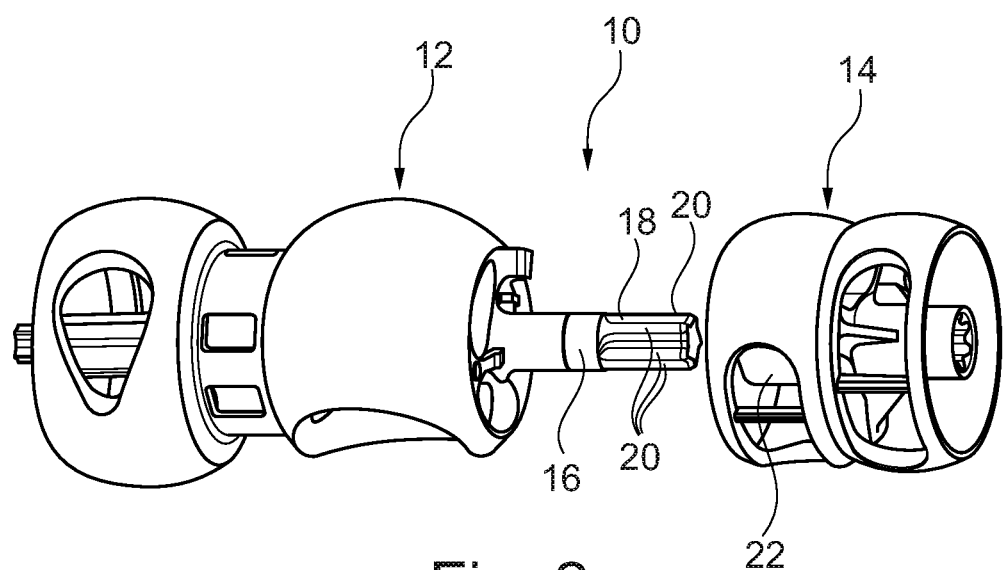
FIG. 2 is another perspective view of the rotary valve assembly of FIG. 1.

With reference to FIGS. 1 and 2, a rotary valve assembly 10 is shown including a first rotary valve 12 (also referred to as a primary valve) and a second rotary valve 14 (also referred to as a secondary valve). The rotary valve assembly 10 may be used in a thermal management module (TMM) to regulate the flow of liquid or gas through a system, such as a vehicle heating/cooling system. In one example, the TMM may be used to regulate coolant in a vehicle's power or drive train, as described above. However, the rotary valve assembly 10 is not limited to thermal management modules or to use in vehicles, but rather may be implemented in any application where multiple rotary valves are used.

The first rotary valve 12 may have a primary shaft 16. The primary shaft 16 may include a primary spline feature 18, which may be located at one end of the primary shaft 16. The primary spline feature 18 may be integrally formed with the primary shaft 16 as a single piece. The primary spline feature 18 may include a plurality of splines 20, for example, 3, 4, 5, 6, or more splines 20. In at least one embodiment, the first rotary valve 12 may be formed from a polymer material, which may be a thermoplastic. All, or substantially all, of the first rotary valve 12 may be formed of the polymer, which may include the primary shaft 16 and the primary spline feature 18. In one embodiment, the polymer may be a high-performance thermoplastic, such as polyphenylene sulfide (PPS). The polymer (e.g., PPS) may be a composite material having a reinforcing material included therein, such as glass (e.g., fibers). The first rotary valve 12 may be formed using any suitable process, such as injection molding or other types of molding. Due to potentially high stresses on the splines 20, and to provide more uniform stress distribution, the splines 20 may have a rounded or curved surface features. In one embodiment, the splines 20 may be lobe-shaped, having sloped sides and a curved tip (as shown in FIGS. 1-2).

The second rotary valve 14 may have a secondary shaft 22. A portion of the secondary shaft 22 may include a secondary spline feature 24, which may be located at one end of the secondary shaft 22. The secondary spline feature 24 may be integrally formed with the secondary shaft 22 as a single piece. The secondary spline feature 24 may include a plurality of splines 26, which may correspond in number, size, and shape with splines 20 such that they mesh with splines 20 of the primary spline feature 18. The secondary spline feature 24 may be hollow or tubular, such that it receives the primary spline feature 18. Accordingly, the primary spline feature 18 may be considered a male spline feature and the secondary spline feature 24 may be considered a female spline feature (e.g., as shown). However, one of ordinary skill in the art will understand, based on the present disclosure, that the male and female may be reversed.

Similar to the first rotary valve 12, the second rotary valve 14 may be formed from a polymer material, which may be a thermoplastic. All, or substantially all, of the second rotary valve 14 may be formed of the polymer, which may include the secondary shaft 22 and the secondary spline feature 24. In one embodiment, the polymer may be a high-performance thermoplastic, such as polyphenylene sulfide (PPS). The polymer (e.g., PPS) may be a composite material having a reinforcing material included therein, such as glass (e.g., fibers). The second rotary valve 14 may be formed using any suitable process, such as injection molding or other types of molding. The splines 26 may have a rounded shape, which may be the inverse shape of the splines 20 such that they mesh together. In one embodiment, the splines 26 may be lobe-shaped, having sloped sides and a curved tip (as shown in FIGS. 1-2).

When the rotary valve assembly 10 is assembled, the first rotary valve 12 is coupled to the second rotary valve such that they rotate together around the longitudinal axis. The primary shaft 16 is inserted into the secondary shaft 22 such that the splines 20 of the primary spline feature 18 are meshed with the splines 26 of the secondary spline feature 24.

Figure 3:
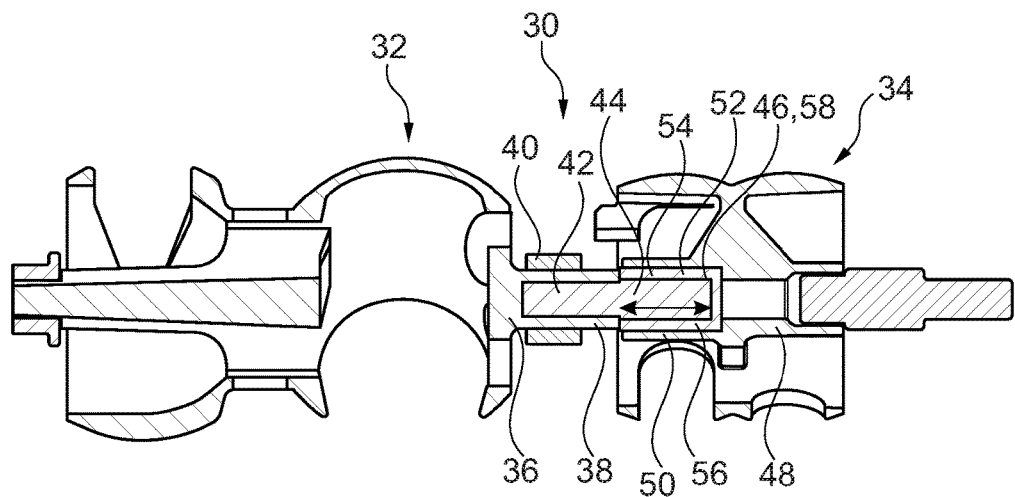
FIG. 3 is a cross-sectional view of a rotary valve assembly with over-molded spline features, according to an embodiment.

With reference to FIG. 3, a cross-section of a rotary valve assembly 30 is shown including a first rotary valve 32 and a second rotary valve 34. The first rotary valve 32 may have a primary shaft 36. One end of the primary shaft 36 may define a hollow or tubular portion 38. The hollow portion 38 may include a circular or substantially-circular outer shape in axial cross-section (e.g., a plane perpendicular to the axial direction). The primary shaft 36 may be supported in a bearing 40, which may be any suitable type of bearing (e.g., plain bearing, rolling bearing, etc.). In one embodiment, the bearing may at least partially support the primary shaft 36 in an axial section that includes the hollow portion 38.

In at least one embodiment, a first spline piece 42 may be disposed within an inner cavity of the hollow portion 38. The first spline piece 42 may be formed of a different material than the primary shaft 36. In one embodiment, the first spline piece 42 may be formed of a metal, such as steel, aluminum, copper, or alloys thereof (e.g., brass).

In at least one embodiment, the first rotary valve 32 may be over-molded onto the first spline piece 42. However, other joining or coupling techniques may be used, such as press-fitting, adhesive, or mechanical fasteners. The first spline piece 42 may include a primary spline feature 44, which may be located at one end of the first spline piece 42 and may extend beyond an axial end of the hollow portion 38 of the primary shaft 36. The primary spline feature 44 may be integrally formed with the first spline piece 42 as a single piece. The primary spline feature 44 may be formed of metal, even if not formed integrally with the first spline piece 42. The primary spline feature 44 may include one or more splines 46, for example, one spline or two or more splines (e.g., 3, 4, 5, 6, or more splines).

The second rotary valve 34 may have a secondary shaft 48. At least a portion of the secondary shaft 48 may include a hollow or tubular portion 50, which may be located at one end of the secondary shaft 48. The hollow portion 50 may define an internal cavity in the secondary shaft 48. In some embodiments, the hollow portion 50 may extend the entire length of the secondary shaft 48. In at least one embodiment, a second spline piece 52 may be disposed within the cavity of the hollow portion 50. The second spline piece 52 may be formed of a different material than the secondary shaft 48. In one embodiment, the second spline piece 52 may be formed of a metal, such as steel, aluminum, copper, or alloys thereof (e.g., brass). The second spline piece 52 may be formed of the same material as the first spline piece 42. In one embodiment, the first and second spline pieces may both be formed of a metal having a relatively high coefficient of thermal expansion (CTE) and/or a CTE value that is close to the CTE value of the material used for the primary and/or secondary shafts. In one example, the metal may have a CTE of at least $20 \times 10^{-6}$ m/(m° C.). In another example, metal may have a CTE that is within 20% (e.g., ±20%) of the CTE of the material used for the primary and/or secondary shafts, such as within 10% or within 5%. A relatively high CTE may cause the spline pieces to expand to a similar degree as the plastic rotary valve components, which may improve adhesion/bonding and/or reduce potential lash between the spline pieces and the shafts.

In at least one embodiment, the second rotary valve 34 may be over-molded onto the second spline piece 52. However, other joining or coupling techniques may be used, such as press-fitting, adhesive, or mechanical fasteners. The second spline piece 52 may include hollow portion 54, which may define a cavity open at one end. The second spline piece 52 may include a secondary spline feature 56, which may be defined by an inner wall of the hollow portion 54. The secondary spline feature 56 may therefore be integrally formed with the second spline piece 52 as a single piece. The secondary spline feature 56 may include one or more splines 58, for example, one spline or two or more splines (e.g., 3, 4, 5, 6, or more splines).

The spline(s) 58 of the secondary spline feature 56 may correspond in number, size, and shape with splines 46 such that they mesh with splines 46 of the primary spline feature 18. The shape of the splines 58 may be substantially the inverse shape of the splines 46 such that they mesh together. The secondary spline feature 56 may receive the primary spline feature 44 when the rotary valve assembly 30 is assembled to form a spline joint. Accordingly, the primary spline feature 44 may be considered a male spline feature and the secondary spline feature 56 may be considered a female spline feature (e.g., as shown). However, one of ordinary skill in the art will understand, based on the present disclosure, that the male and female may be reversed.

Accordingly, a metal first spline piece 42 may be disposed within an inner cavity of the primary shaft 36, which may be formed of a polymer (e.g., PPS). Further, a metal second spline piece 52 may be disposed within an inner cavity of the secondary shaft 48, which may be formed of a polymer (e.g., PPS). The metal secondary spline feature 56 may receive and mesh with the metal primary spline feature 44 to form a spline joint. Therefore, the torque from the primary shaft 36 to the secondary shaft 48 (or vice versa) may be transferred via metal components (e.g., mating spline features). This is a departure from the rotary valve assembly 10, in which the torque is transferred via primary and secondary shafts 16 and 22 that are formed mostly or completely of plastic. However, the other portions of the assembly 30 may remain plastic, allowing them to be lightweight and easily formed.

It is believed that the rotary valve assembly 30 may have several benefits over the rotary valve assembly 10. For example, plastic components may be formed using injection molding, which may have unstable or complicated shrinkage behavior and may result in uncertain dimensions or uneven surface features compared to other manufacturing processes. Accordingly, the lash or clearance between plastic spline features may be relatively high. This may, in turn, lead to hysteresis issues in the system. The metal spline features of assembly 30 may be fabricated to a better precision than plastic spline features (e.g., PPS), which may reduce the lash and, therefore, the hysteresis. Another potential issue with plastic spline features may be stress or fatigue risk. At end-stop operations (e.g., when one of the rotary valves 32 and 34 or 12 and 14 reaches a mechanical restriction, called end-stop), for example, the spline features may experience high stress (e.g., due to a high stall torque from the actuator and/or an inertia-induced impact). The uncertain dimensions or uneven surface features described above, as well as potential post-molding deformation (such as those caused by creep or water absorption), may result in uneven stress distribution and local high-stress points, especially considering relatively lower stress limits associated with plastic materials. As described above, the metal spline features of assembly 30 may be more precisely dimensioned, which may improve stress distribution and reduce stress concentrations. The metal spline features may also be higher in strength, which may allow the contact area between the spline features to be reduced and/or allow for different or more compact spline shapes to be used.

Figure 4:
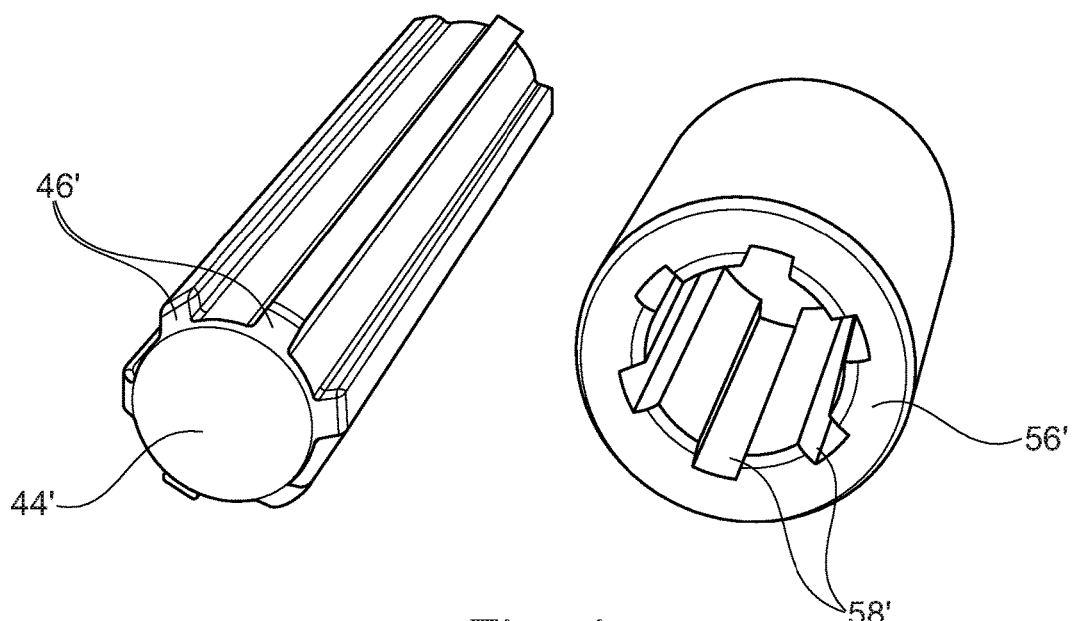
FIG. 4 is a perspective view of corresponding spline shafts, according to an embodiment.
Figure 5:
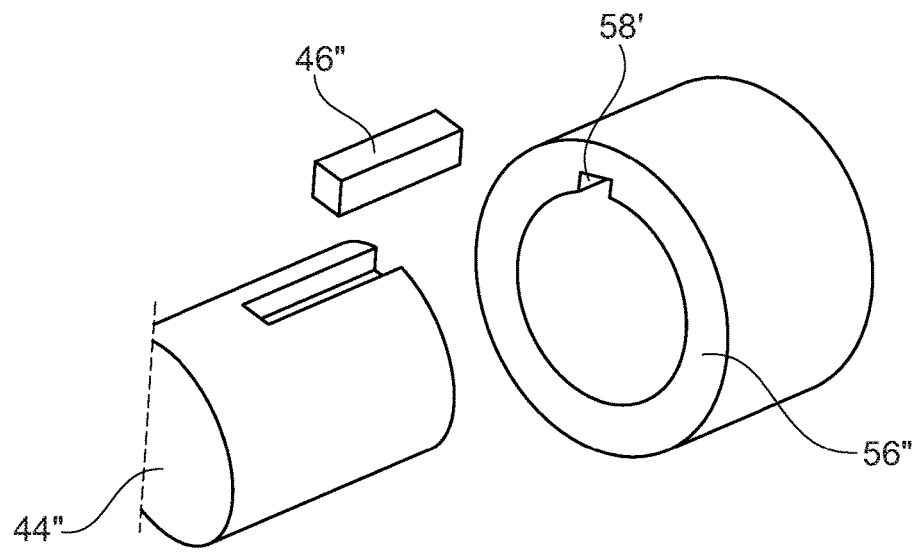
FIG. 5 is a perspective view of corresponding spline shafts, according to another embodiment.
Figure 6:
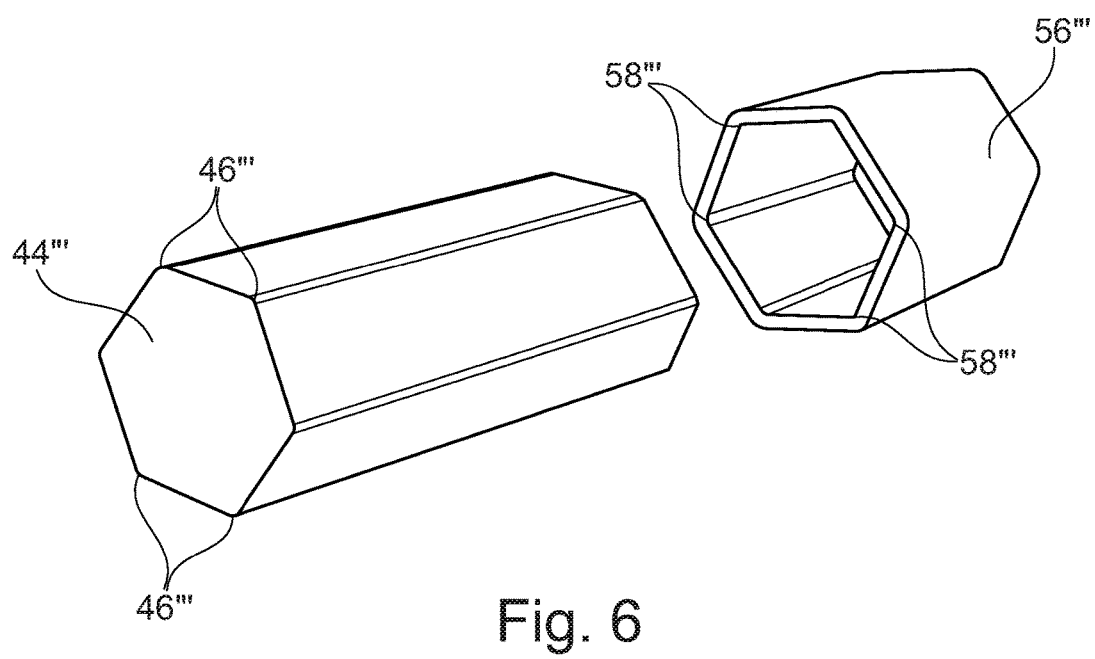
FIG. 6 is a perspective view of corresponding spline shafts, according to another embodiment.

With reference to FIGS. 4-6, examples of spline feature shapes are shown. The examples shown and described are non-limiting and, based on the present disclosure, one of ordinary skill will understand that the spline designs may be modified or other spline designs may be used. In addition, the lobe-shaped splines 20 and 26 from assembly 10 may also be used. In the examples below, male (primary) spline features and corresponding female (secondary) spline features are shown. Accordingly, similar numerals will be used to those described in FIG. 3.

With reference to FIG. 4, a primary spline feature 44' and a secondary spline feature 56' are shown. The primary spline feature 44' includes splines 46', and the secondary spline feature 56' includes corresponding splines 58'. In this embodiment, the splines have a multiple key shaft configuration. The splines 46' shown include generally rectangular projections with arced recessed sections in between, while the splines 58' shown include corresponding generally rectangular recessed sections with arced projections in between. However, other projection/recessed section shapes may be used, such as square, triangular, irregular, or others. In the embodiment shown, there are six projections and corresponding recessed sections, however, there may be fewer or more. For example, there may be from 2-20 projections and corresponding recessed sections, or any sub-range therein, such as 2-10, 3-8, or 2-6. In the embodiment shown, the outer surface of the secondary spline feature 56' is cylindrical, in which case the cavity of the hollow portion 50 of the secondary shaft may have a corresponding cylindrical shape. However, the outer surface of the secondary spline feature 56' may have any suitable shape (e.g., in axial cross-section), such as square, hexagonal, polygonal, or others. The hollow portion 50 of the secondary shaft may have a corresponding shape.

With reference to FIG. 5, a primary spline feature 44" and a secondary spline feature 56" are shown. The primary spline feature 44" includes spline 46", and the secondary spline feature 56" includes corresponding spline 58". In this embodiment, the splines have a one, or single, key shaft configuration. The spline 46" (or key) shown includes a generally rectangular projection, while the spline 58" (or keyway) shown includes a corresponding generally rectangular recessed section. However, other projection/recessed section shapes may be used, such as square, triangular, irregular, or others. In the embodiment shown, the key is shown as a removable key, however, the key may be rigidly fixed to the primary spline feature 44", and may be integrally formed therewith as a single piece. In the embodiment shown, the outer surface of the secondary spline feature 56" is cylindrical, in which case the cavity of the hollow portion 50 of the secondary shaft may have a corresponding cylindrical shape. However, the outer surface of the secondary spline feature 56" may have any suitable shape (e.g., in axial cross-section), such as square, hexagonal, polygonal, or others. The hollow portion 50 of the secondary shaft may have a corresponding shape.

With reference to FIG. 6, a primary spline feature 44''' and a secondary spline feature 56''' are shown. The primary spline feature 44''' includes splines 46''' and the secondary spline feature 56''' includes corresponding splines 58'''. In this embodiment, the primary spline feature 44''' is hexagonal in axial cross-section (e.g., a plane perpendicular to the axial direction) and the splines 46''' are formed by the corners of the hexagon. The splines 58''' in this embodiment include corresponding recessed sections shaped to receive the corners of the hexagon. While a hexagonal shape is shown, other cross-sectional shapes may be used, such as, triangular, square, pentagonal, polygonal, irregular, or others. In some embodiments, the cross-sectional shapes, even those of a polygon, may be formed such that they are not perfectly axisymmetric. This may help secure a particular or desired singular relationship between two primary and secondary shafts along the shaft axis.

In embodiments where a solid, geometrical primary spline feature 44''' is used, the secondary spline feature 56''' may include a corresponding internal cavity configured to receive the primary spline feature 44'''. For example, the geometric shape of the primary spline feature 44''' may include a certain number of points or corners and the secondary spline feature 56''' may have an opening or channel with the same geometric shape with a same number of points or corners to receive the primary spline feature 44'''. In another example, the secondary spline feature 56''' may have an opening or channel with a fewer number of points or corners to receive the primary spline feature 44'''. In the embodiment shown, the outer surface of the secondary spline feature 56' is hexagonal, in which case the cavity of the hollow portion 50 of the secondary shaft may have a corresponding hexagonal shape. However, the outer surface of the secondary spline feature 56' may have any suitable shape (e.g., in axial cross-section), such as circular, square, or others. The hollow portion 50 of the secondary shaft may have a corresponding shape, which may result naturally from an over-molding process.

Figure 7A:
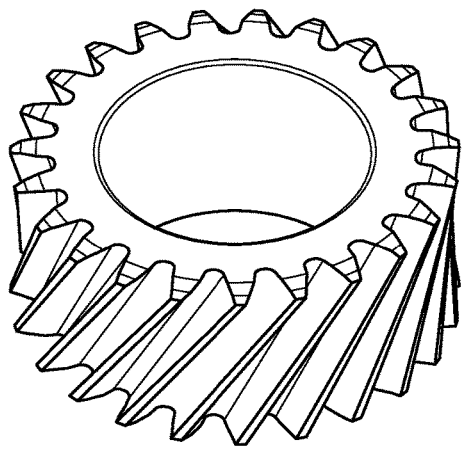
FIGS. 7A and 7B are perspective views of examples of knurling that may be used on the spline shafts.
Figure 7B:
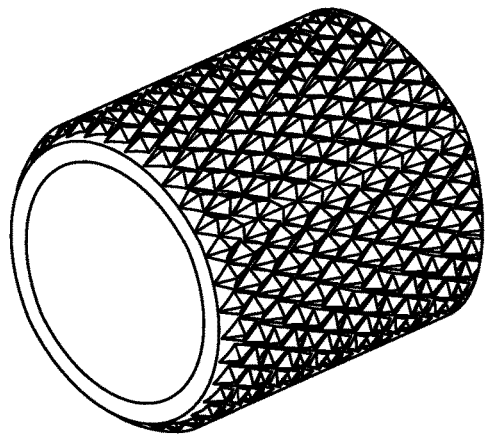

With reference to FIGS. 7A and 7B, examples of knurling 60 are shown that may be applied to the outer surface of the first and/or second spline pieces (e.g. the surface that contacts the wall of the cavity in the hollow portion 38 or hollow portion 50 of the primary shaft 36 or secondary shaft 48, respectively). Instead of knurling, which generally includes straight, angled or crossed lines, formed in a material (e.g., metal), other texturing of the outer surface may be performed. In general, texturing may refer to a pattern of raised and indented/depressed portions, such as a roughened (mechanically or chemically) or etched surface.

Accordingly, a knurling 60 like that shown, or other textured/knurling patterns, may be formed on the outer surface of the spline pieces 42 and/or 52, which may have any suitable cross-sectional shape, such as circular, hexagonal, square, polygonal, etc. As described above, the first and/or second rotary valves 32 and 34 may be over-molded onto the first and second spline pieces, respectively. The texturing/knurling may improve the mechanical bonding/interlocking between the valve material (e.g., plastic) and the spline piece (e.g., metal). Even if there is some material shrinkage in the spline piece, such as after molding, the texturing/knurling may provide sufficient contact between the materials to retain the spline piece in the cavity of the shaft. The texturing/knurling process may be performed on the spline pieces prior to the over-molding (or other joining) process. The process may include cutting, rolling, roughening, etching, or other techniques.

Figure 8:
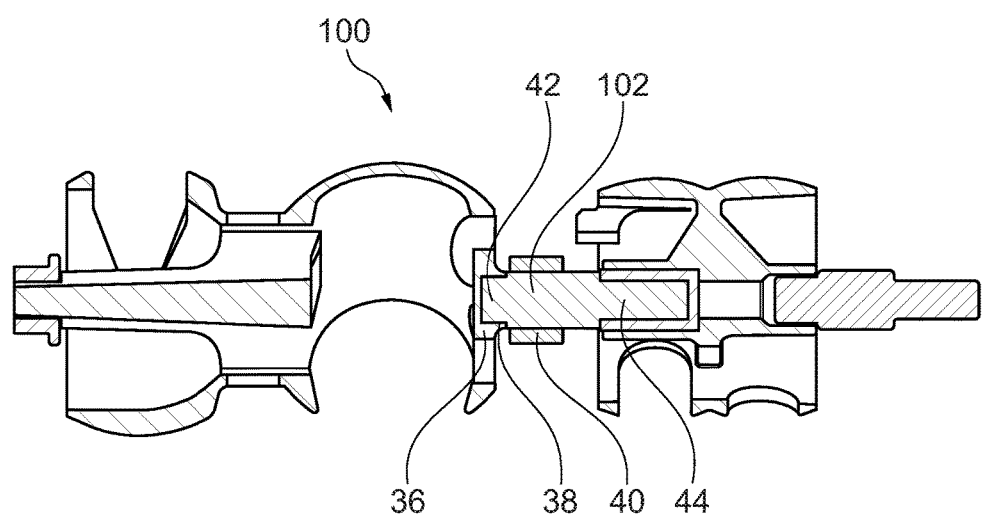
FIG. 8 is a cross-sectional view of a rotary valve assembly with over-molded spline features and middle section, according to an embodiment.

With reference to FIG. 8, a cross-section of a rotary valve assembly 100 is shown. Rotary valve assembly 100 may be similar to assembly 30, and like elements are numbered the same and will not be described again in detail. Elements that are not numbered may be considered the same as in assembly 30. One difference in assembly 100 is the inclusion of a middle section 102 in the first spline piece 42. The middle section 102 may be disposed between and/or separate the portion of the first spline piece 42 that is disposed within the cavity of the hollow portion 38 and the primary spline feature 44. The hollow portion 38 of the primary shaft 36 may be shortened compared to assembly 30 to accommodate the middle section 102. The middle section 102 may have a larger diameter than the portion of the first spline piece 42 that is disposed within the cavity of the hollow portion 38. However, a larger diameter is not required.

In one embodiment, the diameter of the middle section 102 may be the same or similar to the outer diameter of the primary shaft 36 (e.g., ±5% or 10%). The primary shaft 36 may no longer be directly supported in the bearing 40 in the assembly 100. Instead, the bearing may support the middle section 102 of the first spline piece 42. The middle section 102 may be integrally formed with the rest of the first spline piece 42 and may also be formed of metal. Similar to the splines, forming the middle section 102 out of metal may allow better/tighter tolerance control. This may allow for a tighter gap or clearance and thus an improved control of the gap seal between the bearing 40 and the middle section 102 compared to the plastic primary shaft 36. The bearing 40 may typically be pressed-in a wall (not shown) that separates two fluid chambers, home for the first and second rotary valves 12 and 14. It may be desirable to minimize the fluid leakage between these two chambers (called chamber-to-chamber leakage), which can be achieved either by a shaft seal in the gap or having a tight gap (often called a gap seal, wherein there is actually no seal or sealing part, just a tight gap to achieve effective sealing function, e.g., minimum leakage). The fluid leakage rate may typically be proportional to the gap or gap size to the $3^{rd}$ power for a laminar flow. The improved gap seal control may allow for the elimination or non-use of a shaft seal, which may reduce cost and durability risk. The gap seal may be further improved by using a metal bearing for bearing 40 to have a more precise bearing internal diameter and, thus, a tighter gap. Assembly 100 may therefore improve/reduce the chamber-to chamber-leakage of the assembly.

Figure 9:
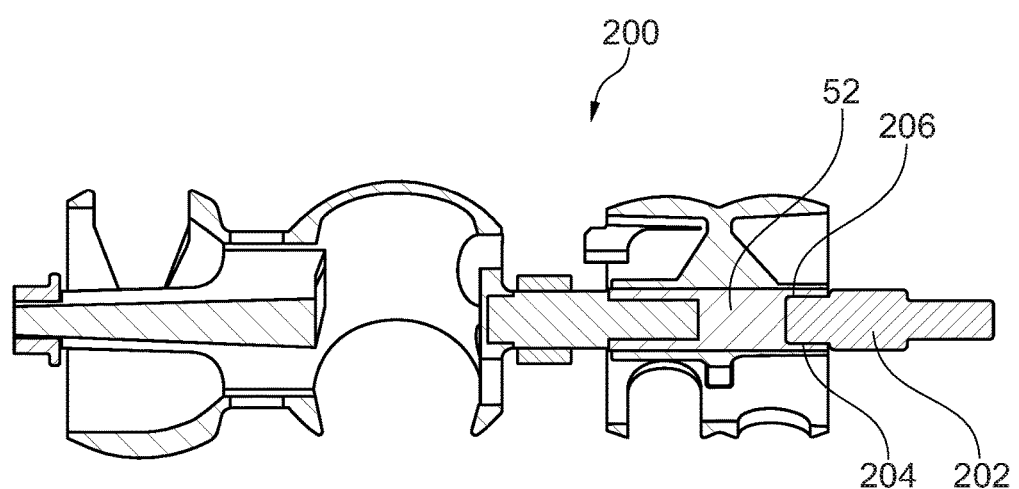
FIG. 9 is a cross-sectional view of a rotary valve assembly with over-molded spline features and an extended secondary spline feature, according to an embodiment.

With reference to FIG. 9, a cross-section of a rotary valve assembly 200 is shown. Rotary valve assembly 200 may be similar to assembly 30 or assembly 100, and like elements are numbered the same and will not be described again in detail. Elements that are not numbered may be considered the same as in assembly 30. While assembly 200 is shown with the first spline piece 42 having a middle section 102, the first spline piece 42 may be similar to the embodiment of FIG. 3 (assembly 30). One difference in assembly 200 is the extension of the second spline piece 52 farther down the hollow portion 50 of the secondary shaft 48 (e.g., in the direction opposite the first rotary valve 32). The hollow portion 50 may extend to an opposite end of the second rotary valve 34, where it may be configured to receive a shaft 202, which may be referred to as a stub shaft.

The shaft 202 in assembly 30 may be received by the secondary shaft 48 in a manner similar to that of the first and second spline features of assembly 10. For example, the shaft 202 may have a male spline feature that may mesh with a female spline feature integrally formed in the secondary shaft 48. In the embodiment of FIG. 9, the second spline piece 52 may extend such that is receives the first spline feature 44 on one end via secondary spline feature 56 and the spline feature 204 of the shaft 202 on the other end via a tertiary spline feature 206. The spline features 204 and 206 may have any suitable configuration, such as those described above for the first and second spline features. The extended second spline piece 52 in assembly 200 may provide similar benefits to the first and second spline features. For example, the second spline piece 52 may be metal, which, as described above, may provide for improved tolerances, reduced lash, and/or better stress distribution. If the shaft 202 is formed of metal, then a similar metal-metal joint may be formed.

In the embodiments shown and described above, the rotary valve assemblies included either both plastic or both metal spline pieces/features. However, in some embodiments, plastic and metal spline pieces/features may be mixed. Having a single metal spline piece/feature may provide improved properties, such as stress distribution or chamber-to-chamber leakage, compared to plastic-only spline pieces. Accordingly, in some embodiments, only one of the spline pieces (e.g., 42 and 52 shown in FIG. 3, 8 or 9) may be formed of metal, while the other spline piece may be formed of plastic (e.g., PPS). If the spline piece is formed of plastic, it may be integrally formed (e.g., as a single piece) with the rotary valve and/or shaft, for example, as shown in FIGS. 1 and 2. However, in some embodiments, a plastic spline piece may be formed as a separate part. Either spline piece may be formed of metal, and the decision may depend on, for example, the relative structural vulnerabilities of the spline features shown in FIGS. 1-2. The metal spline piece may be used to replace the more vulnerable spline piece. However, it is not required that the more vulnerable piece be replaced. In one embodiment, the female spline piece (e.g., including internal splines) may be formed of metal and the male spline piece (e.g., including external splines) may remain plastic. Of course, the opposite configuration may also be used.

Accordingly, multiple embodiments of rotary valve assemblies are disclosed. The assemblies may include metal spline pieces/features that provide for a metal-metal spline joint between two rotary shafts. This may reduce hysteresis due to lash, improve stress distribution to reduce stress or fatigue fracture, and/or allow for more cost effective designs. In some embodiments, leakage between chambers may be reduced by providing a middle section made of metal that has improved gap seal control with a supporting bearing. In view of the present disclosure, one of ordinary skill in the art will understand that components may be mixed and matched between the embodiments, for example, spline piece/feature shapes and designs.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A rotary valve assembly, comprising:
   a first rotary valve including:
      a primary shaft including a first spline piece having a primary spline feature including one or more primary splines;
   a second rotary valve including:
      a secondary shaft including a second spline piece having a secondary spline feature including one or more secondary splines; and
   the one or more primary splines and the one or more secondary splines configured to mesh together to form a spline joint between the first and second rotary valves;
   wherein at least one of the primary or secondary shafts has a hollow portion defining an inner cavity, at least one of the first spline piece or the second spline piece is formed of metal, and a portion of the metal spline piece is disposed within and over-molded by the hollow portion.

2. The assembly of claim 1, wherein each of the primary and secondary shafts includes the hollow portion and each of the first spline piece and the second spline piece are formed of metal and a have a portion disposed within the hollow portion of the primary and secondary shafts.

3. The assembly of claim 1, wherein an outer surface of the metal spline piece is textured.

4. The assembly of claim 1, wherein the primary spline feature is a male spline feature and the secondary spline feature is a female spline feature configured to receive the primary spline feature.

5. The assembly of claim 1, wherein the secondary spline feature is a male spline feature and the primary spline feature is a female spline feature configured to receive the primary spline feature.

6. The assembly of claim 1, wherein the primary spline feature and the secondary spline feature have a keyed configuration.

7. The assembly of claim 6, wherein the keyed configuration is a single key configuration.

8. The assembly of claim 6, wherein the keyed configuration is a multiple key configuration.

9. The assembly of claim 1, wherein the primary and secondary spline features have a pair of mating polygon axial cross-sections.

10. The assembly of claim 1, wherein the first spline piece and the second spline piece are each formed of a metal having a coefficient of thermal expansion of at least $20 \times 10^{-6}$ m/(m° C.).

11. A rotary valve assembly, comprising:
a first rotary valve including:
a primary shaft including a first spline piece having a primary spline feature including one or more primary splines;
a second rotary valve including:
a secondary shaft including a second spline piece having a secondary spline feature including one or more secondary splines; and
the one or more primary splines and the one or more secondary splines configured to mesh together to form a spline joint between the first and second rotary valves;
wherein:
at least one of the primary or secondary shafts has a hollow portion defining an inner cavity;
the first spline piece is formed of metal, and further includes a middle section between the primary shaft and the primary spline feature; and,
a portion of the first spline piece is disposed within the hollow portion.

12. The assembly of claim 11, wherein the middle section is configured to be supported by a bearing.

13. A method, comprising:
over-molding a primary shaft of a first rotary valve onto a first end of a first metal spline piece, a second end of the first metal spline piece including a primary spline feature;
over-molding a secondary shaft of a second rotary valve onto a second metal spline piece including a secondary spline feature; and
coupling the primary and secondary spline features together to form a metal-on-metal spline joint between the first and second rotary valves.

14. The method of claim 13, further comprising texturing an outer surface of the first end of the first metal spline piece and an outer surface of the second metal splice piece prior to the over-molding steps;

over-molding the primary shaft of the first rotary valve onto the textured outer surface of the first end of the first metal spline piece; and
over-molding the secondary shaft of the second rotary valve onto the textured outer surface of the second metal spline piece.

15. The method of claim 13, wherein the first metal spline piece includes a middle section between the first end and the second end, and the method further includes supporting the middle section in a bearing.

16. The method of claim 13, wherein over-molding the secondary shaft of the second rotary valve onto the second metal spline piece includes over-molding an entire length of the secondary shaft onto the second metal spline piece.

17. The method of claim 16, wherein the second metal spline piece includes a tertiary spline feature on an opposite side from the secondary spline feature, and the method further includes coupling the tertiary spline feature with a tertiary shaft.

18. The method of claim 13, wherein the primary spline feature has a polygon shape in axial cross-section and the secondary spline feature includes a polygon cavity sized and configured to receive the primary spline feature.

19. A rotary valve assembly, comprising:
a first rotary valve including:
a primary shaft including a first spline piece having a primary spline feature including one or more primary splines;
a second rotary valve including:
a secondary shaft including:
a hollow portion defining an inner cavity, the inner cavity extending from a first end of the secondary shaft to a second, opposite end of the secondary shaft; and,
a metal second spline piece disposed within the hollow portion, the metal second spline piece extending from the first end of the secondary shaft to the second end and having a secondary spline feature including one or more secondary splines, the secondary spline feature located at the first end of the secondary shaft;
the one or more primary splines and the one or more secondary splines configured to mesh together to form a spline joint between the first and second rotary valves; and,
the metal second spline piece includes a tertiary spline feature at the second end of the secondary shaft that is configured to receive a tertiary shaft.

* * * * *